(12) United States Patent
Banerjee et al.

(10) Patent No.: US 7,263,555 B2
(45) Date of Patent: Aug. 28, 2007

(54) APPARATUS AND METHOD FOR DYNAMIC SHARING OF SERVER NETWORK INTERFACE RESOURCES

(75) Inventors: Dwip N. Banerjee, Austin, TX (US); Lilian Sylvia Fernandes, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 10/427,387

(22) Filed: Apr. 30, 2003

(65) Prior Publication Data

US 2004/0221065 A1 Nov. 4, 2004

(51) Int. Cl.
G06F 15/173 (2006.01)
G06F 9/46 (2006.01)
G06F 15/16 (2006.01)

(52) U.S. Cl. ............... 709/226; 709/250; 370/231; 718/107

(58) Field of Classification Search .......... None
See application file for complete search history.

(56) References Cited

U.S. PATENT DOCUMENTS

| | | | |
|---|---|---|---|
| 6,243,360 B1* | 6/2001 | Basilico | 370/231 |
| 2003/0195962 A1* | 10/2003 | Kikuchi et al. | 709/226 |
| 2004/0019680 A1* | 1/2004 | Chao et al. | 709/226 |
| 2004/0055002 A1* | 3/2004 | Das | 718/107 |
| 2004/0088413 A1* | 5/2004 | Bhogi et al. | 709/226 |
| 2004/0181595 A1* | 9/2004 | Banerjee et al. | 709/226 |

OTHER PUBLICATIONS http://hotwired.lycos.com/webmonkey/97/49/index3a_page3.html?tw=backend, "Turning Apache Web Servers for Speed", Apr. 5, 2003, pp. 1-4.

* cited by examiner

Primary Examiner—Wen-Tai Lin
(74) Attorney, Agent, or Firm—Duke W. Yee; Diana R. Gerhardt; Mari Stewart

(57) ABSTRACT

An apparatus and method for dynamic sharing of server network interface resources are provided. With the apparatus and method, when a master application server detects a heavy load condition on one or more network interfaces associated with the server computing device, the master application server spawns additional slave application subservers. The network interfaces are distributed across the slave application subservers and are bound to the network interfaces to which they are associated. The master application server continues to listen for traffic on a standard port of all network interfaces. When a new communication connection request is received via a port associated with a network interface, the slave application subserver associated with the network interface will first process the new communication connection request without having to have the master application server route the data packet to the slave application subserver.

28 Claims, 4 Drawing Sheets

APPARATUS AND METHOD FOR DYNAMIC SHARING OF SERVER NETWORK INTERFACE RESOURCES

BACKGROUND OF THE INVENTION

1. Technical Field

The present invention is directed to an apparatus and method for dynamic sharing of server network interface resources. More specifically, the present invention is directed to an apparatus and method for spawning slave application servers, distributing interfaces over the spawned slave application servers, and binding spawned slave application servers to interfaces in accordance with the distribution.

2. Description of Related Art

Application servers are software applications in an intranet/Internet environment that hosts a variety of language systems used to program database queries and/or perform general business processing. The application server may reside in the same computer as the Web server, i.e. the HyperText Transport Protocol (HTTP) server, or may be in a separate computer. In large Web sites, multiple processors, or multiple computers, are used for both application servers and Web servers (HTTP servers). An examples of a Web application server is International Business Machines, Inc. (IBM) WebSphere Application Server.

With increased usage of the Internet, many times application servers experience heavy loads from client devices on the Internet. That is, the application servers receive more requests from client devices than the application server can service while providing a predetermined quality of services. As a result, the application server may have to drop certain requests, i.e. reject connections with client devices. Thus, in commercial applications, possible sources of revenue are rejected due to the limitations of the application server.

This problem is often solved by having a main server spawn new sub-servers and then the main server redirects connects to these sub-servers. For example, the Apache Web server is one type of server that supports this spawning and redirection to sub-servers. However, such a solution has significant drawbacks. The predominate drawback to this sort of approach is that the main server that spawned the sub-servers still must accept and process new connection requests and to handle new requests and complete a TCP three-way handshake. In other words, the main server still remains as a bottleneck in the handling of new connection requests.

Thus, it would be beneficial to have an apparatus and method for dynamically sharing server network interface resources such that the main server no long must handle new connection requests.

SUMMARY OF THE INVENTION

The present invention provides an apparatus and method for dynamic sharing of server network interface resources. With the apparatus and method, when a master application server detects a heavy load condition on one or more network interfaces associated with the server computing device, the master application server spawns additional slave application subservers. The network interfaces are distributed across the slave application subservers and are bound to the network interfaces to which they are associated. The master application server continues to listen for traffic on a standard port of all network interfaces.

When a new communication connection request is received via a port associated with a network interface, the slave application subserver associated with the network interface will first process the new communication connection request without having to have the master application server route the data packet to the slave application subserver. If the slave application subserver dies or core dumps due to some failure then any new connection request packets will be given to the master application server as it has its socket bound to (*0.80, where * is a wild character so (the interpretation for * is all the interfaces on this system), "." is the separator and 80 is port number). In this way, new communication connection requests are directed to the slave application subservers directly and the master application server no longer causes a bottleneck for new communication connection request processing.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is directed to a mechanism for spawning of slave application server instances in response to a detected heavy load condition from one or more network interfaces of a server computing device. The slave application servers are bound to certain ones of the network interfaces in accordance with a distribution of the network interfaces over all of the slave application servers. In this way, the slave application servers may receive data packets directly based on the binding of the slave application servers to the network interfaces and thus, the burden on the master application server to route data packets to slave application servers is reduced.

The present invention is directed to the spawning of slave application servers in a server computing device of a distributed data processing system. Therefore, a brief explanation of the elements of a distributed data processing system is provided in order to provide a context for the description of the present invention.

Figure 1:
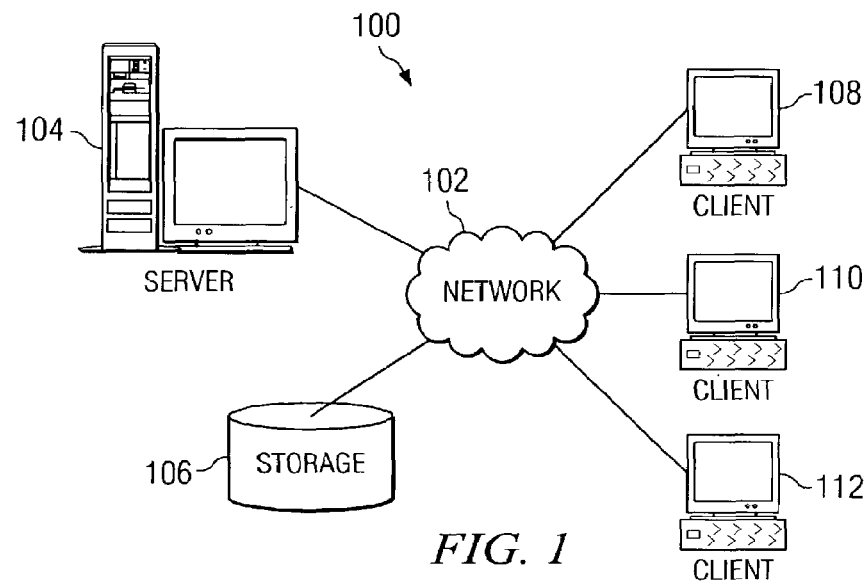
FIG. 1 is an exemplary diagram of a distributed data processing system in accordance with the present invention.

With reference to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
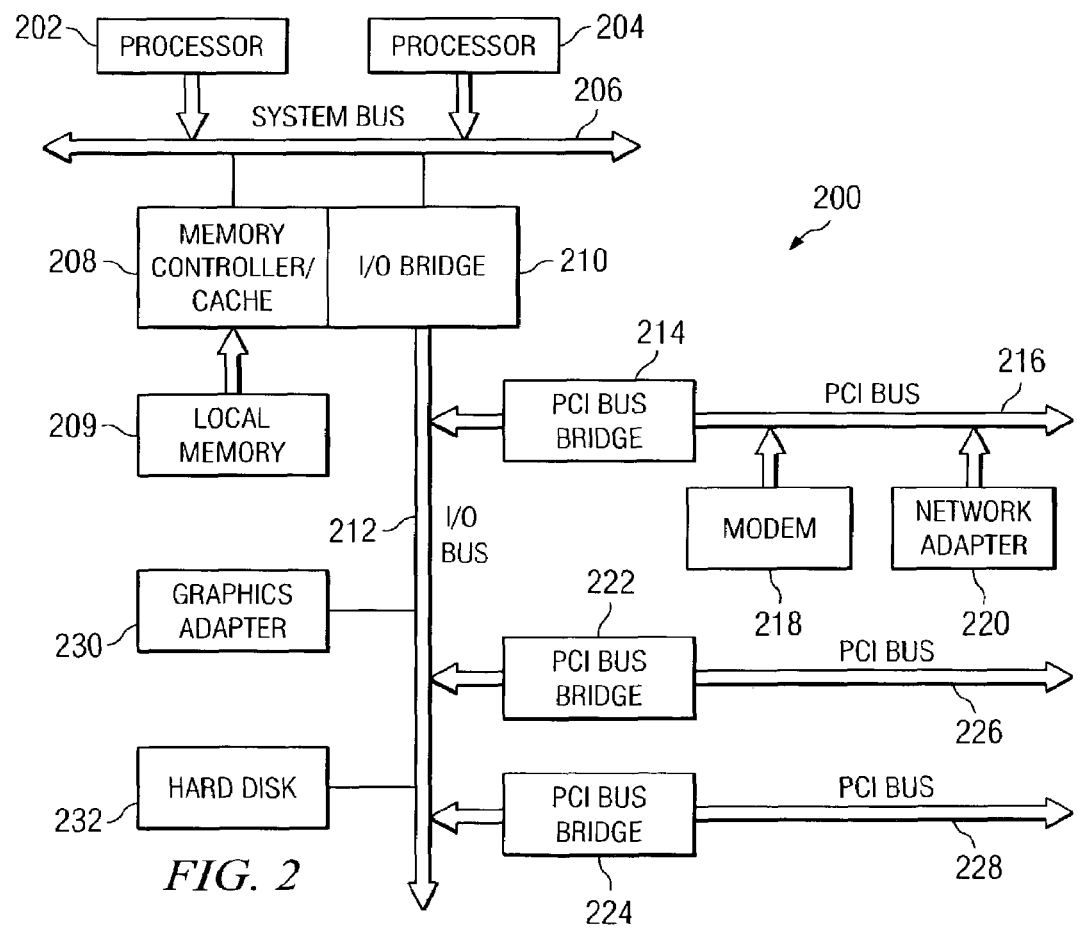
FIG. 2 is an exemplary block diagram of a server computing device in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
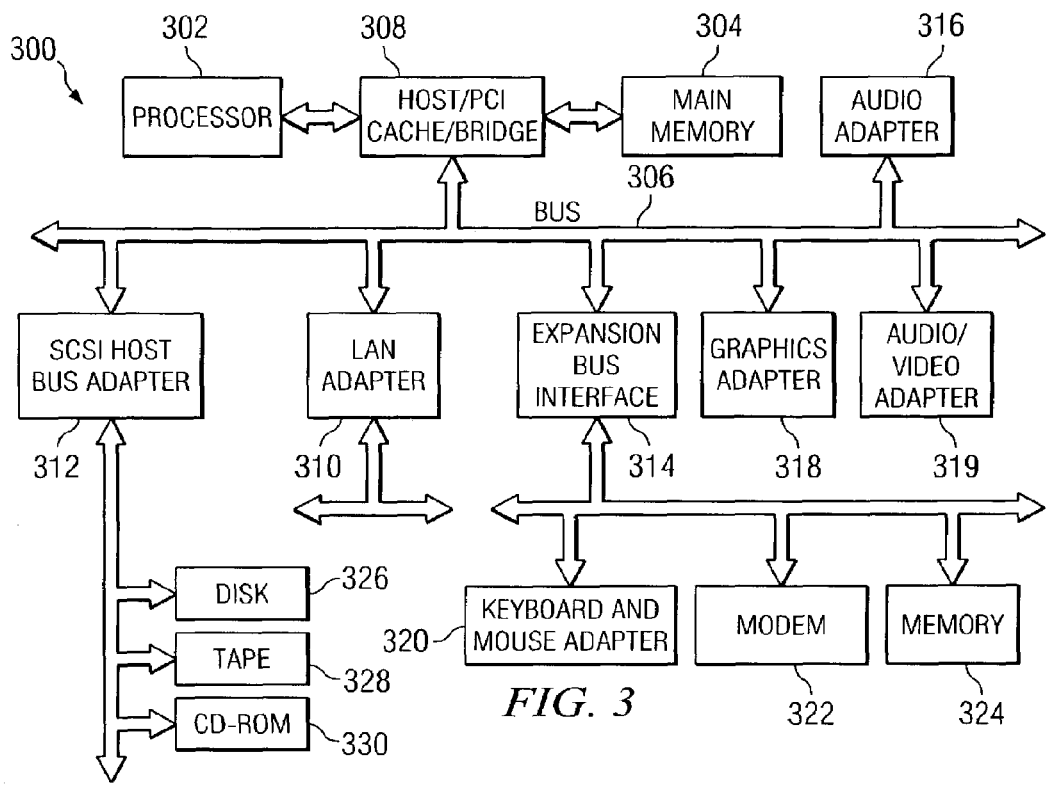
FIG. 3 is an exemplary block diagram of a client computing device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCT bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned previously above, the present invention is directed to a mechanism for spawning slave application subservers to handle heavy loads on one or more network interfaces. The present invention provides an improvement over known systems by providing a mechanism for binding slave application subservers to network interfaces that are distributed across all of the slave application subservers in response to the detection of the heavy load condition.

Figure 4:
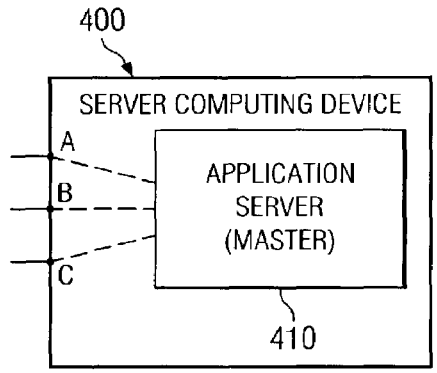
FIG. 4 is an exemplary diagram illustrating an initial operation of a master application server according to the prior art.
Figure 5:
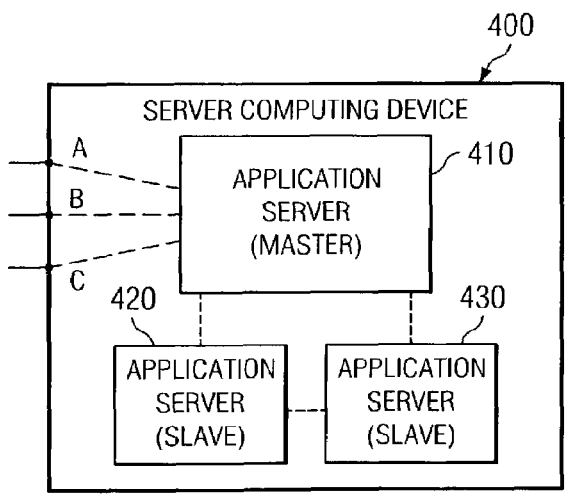
FIG. 5 is an exemplary diagram illustrating an operation of the prior art when spawning of slave application servers.

FIGS. 4 and 5 are exemplary diagrams illustrating an operation according to a known application server. As shown in FIG. 4, in an initial state, the master application server 410 of the server computing device 400 handles all new communication connection requests received from all of the network interfaces A-C. As long as the traffic load is within an acceptable range, the master application server 410 is capable of providing the intended level of service and does not need to start rejecting new communication connection requests. A "new communication connection request" in the present description of the preferred embodiments means any data packet received from a client device that is used to establish a new session between the server computing device and the client device.

The master application server 410 monitors the load levels being received via the network interfaces A-C. In response to a heavy load condition occurring, i.e. the load being equal to or greater than a threshold amount, the master application server 410 may spawn additional application servers as slave application servers to help in the handling of traffic on the network interfaces A-C. The monitoring of load conditions and spawning of slave application servers is generally known in the art. For example, the application netstat—in may be used to generate an approximate representation of the distribution of the load on each of the interfaces processed by the server computing device. This load information may be used by the present invention for making a decision of when to spawn slave subservers and which interfaces are to be bound to the subservers.

FIG. 5 illustrates the server computing device 400 following spawning of two slave application servers 420 and 430 to aid in the handling of communication connection requests. As shown in FIG. 5, the master application server 410 still receives all new communication connection requests from the network interfaces A-C. The master application server 410 then hands off these new communication connection requests to the slave application servers 420 and 430. The slave application servers 420 and 430 process the new communication connection requests, establish a session, and return an acknowledgement to the client device that sent the new communication connection request indicating the proper information for communication directly between the client device and the slave application server.

As can be seen from FIG. 5, if the master application server is overloaded, as is most probably the case since the overload condition is the instigator of the master application server spawning the slave application servers, then the new communication connection requests received from client devices may be rejected or the processing slowed due to the overload condition on the master application server. Thus, the master application server 410 creates a bottleneck with regard to the performance of the server computing device 400 and optimal performance is not achievable with such an arrangement.

In view of the above, the present invention solves the bottleneck problem found in known application server systems by providing a mechanism in which new communication connection requests from network interfaces are directly routed to the slave application servers without having to first go to the master application server. With the mechanism of the present invention, slave application servers are spawned in response to the master application server having detected a heavy load condition on one or more of the network interfaces. The network interfaces are then distributed over the group of slave application servers that were spawned.

That is, the master application server identifies the load or number of packets being received by it on all the interfaces on the system. Based on the load, the master application server decides whether to spawn a slave application server for a specific interface. The slave application servers are then bound to the network interfaces to which they are assigned by registering the association with the operating system of the server computing device. The master application server continues to listen for new communication connection requests, as determined by using standard SYN/SYN-ACK of the TCP/IP protocol, on a standard port of all of the network interfaces.

When a new communication connection request is received via a port associated with a network interface, the slave application subserver associated with the network interface will first process the new communication connection request without having to have the master application server route the data packet to the slave application subserver. If the slave application subserver dies or core dumps due to some failure then any new connection request packets will be given to the master application server because of its socket being bound to *0.80. In this way, new communication connection requests are routed directly to slave application servers in accordance with a distribution of the network interfaces over the group of slave application servers such that the master application server does not cause a bottleneck in the processing of the new communication connection requests. As a result, it is less likely that new communication connection requests will be rejected.

Figure 6:
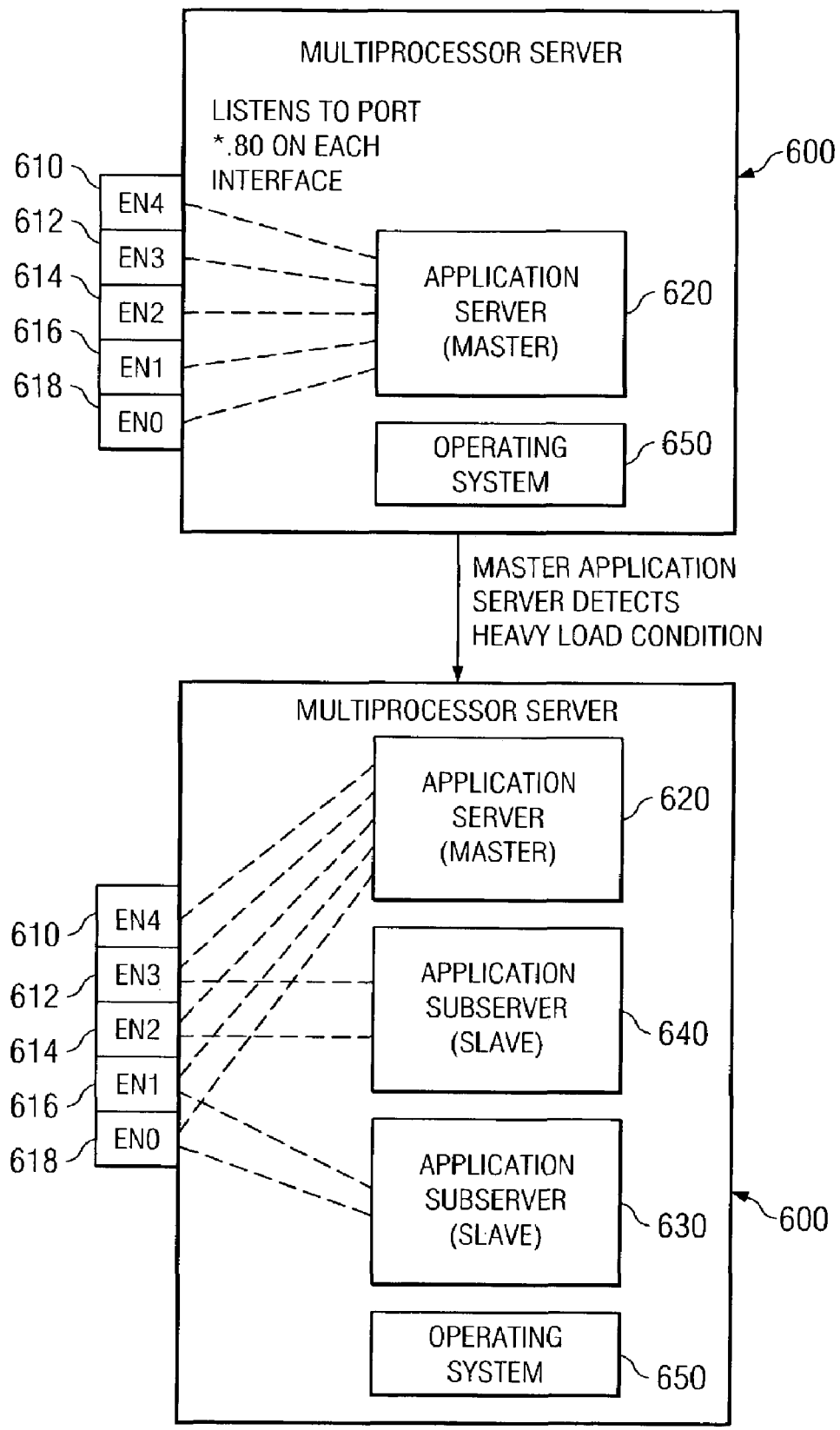
FIG. 6 is and exemplary diagram illustrating the spawning of slave application servers in accordance with the present invention.

FIG. 6 is and exemplary diagram illustrating the spawning of slave application servers in accordance with the present invention. As shown in FIG. 6, in an initial state, i.e. a state in which there are no heavy load conditions on the network interfaces 610-618, the master application server 620 handles all new communication connection requests that are received by the multiprocessor server computing device 600. This is similar to the situation described in FIG. 4 above.

In response to the detection of a heavy load condition on one or more of the network interfaces 610-618, the master application server 620 spawns additional slave application subservers 630 and 640 for handling the traffic being received by network interfaces 610-618. After spawning the slave application subservers 630-640, the master application server 620 distributes the network interfaces across the slave application subservers 630-640 that were spawned.

The distribution of network interfaces over the slave application subservers 630-640 may take many different forms depending on the particular embodiment of the present invention. For example, the distribution may be a simple even distribution of network interfaces such that each slave application subserver 630 and 640 handles traffic from the same number of network interfaces. Any excess of network interfaces, such as if there are an odd number of network interfaces and an even number of slave application subservers, is handled by the master application server 620 in a normal fashion. For example, as shown in FIG. 6, the network interfaces en0 and en1 are assigned to slave application subserver 630, network interfaces en2 and en3 are assigned to slave application subserver 640, and network interface en4 is not assigned to any subserver and thus, is handled by master application server 620.

In alternative embodiments, the distribution of network interfaces may take more elaborate forms. For example, network interfaces may be allocated to application subservers based on expected traffic levels to be received over each network interface. In other words, a load balancing approach may be taken such that the network interfaces are allocated to application subservers so as to balance the traffic load experienced by each of the master application server 620 and the slave application subservers 630 and 640. Thus, for example, the slave application subserver 630 may handle new communication connection requests received over network interfaces en0 and en1 and the slave application server subserver 640 may handle new communication connection requests received over network interfaces en2, en3 and en4. Other methods of distributing network interfaces across slave application subservers may be used without departing from the spirit and scope of the present invention.

Regardless of the particular distribution mechanism used, the resulting distribution of network interfaces is determined by the master application server 620 and the slave application subservers 630 and 640 are bound to their associated network interface(s) in accordance with this distribution. The slave application subservers 630 and 640 are bound to the network interfaces by registering the correspondence between the slave application subservers 630 and the network interfaces 610-618 with the operating system 650. This binding is represented by a socket that is generated for each slave application subserver 630-640 that defines the network interface and the port that is bound to the slave application subserver. For example, port 80 of the network interface en0 may be bound to the slave application subserver 630 by registering the socket en0.80 with the slave application subserver 630 in the operating system 650.

Thus, in the depicted example, initially the master application server 620 is not bound to any of the network interfaces 610-618 but instead listens to port 80 on all of the network interfaces 610-618. For example, the socket for the master application server 620 may be set to *0.80 where the "*" is a wildcard character used such that any new communication connection request received on any of the network interfaces is processed by the master application server 620.

After spawning the slave application subservers 630-640 and distributing the network interfaces across the group of spawned slave application subservers 630-640, the slave application subserver 630 is bound to port 80 on network interfaces en0 and en1, the slave application subserver 640 is bound to port 80 of network interfaces en2 and en3, and the master application server 620 remains listening to *0.80. As a result, the slave application subserver 630 listens to sockets en0.80 and en1.80 and the slave application subserver 640 listens to sockets en2.80 and en3.80. Since the master application server 620 still listens to socket *0.80, any new communication connection requests received over network interface en4 will be handled by the master application server 620.

That is, when a new communication connection request is received over network interface en0, for example, the new communication connection request, received via port 80 of network interface en0, will be matched to the socket en0.80 prior to the socket *0.80 because en0.80 is a more specific match than *0.80. As a result, according to the registration of the slave application subserver 630 being associated with the socket en0.80, the new communication connection request will be routed by the operating system 650 to the slave application subserver 630.

Similarly, if a new communication connection request is received over network interface en4, for example, the new communication connection request, received via port 80 of network interface en4, will be matched to socket *0.80 since there is no other specific socket that more closely matches en4.80. As a result, the new communication connection request will be routed by the operating system to the master application server 620.

Thus, when a new communication connection request is received, it is routed to a slave application subserver 630-640 associated with the network interface on which the new communication connection was received. In this way, the slave application subserver will first process the new communication connection request without having to have the master application server route the data packets of the new communication request to the slave application subserver. If the salve application subserver 630-640 dies or core dumps due to some failure, then any new connection request packets will be given to the master application server 620 because it has a socket bound to *0.80.

In this way, the slave application subservers 630-640 receive new communication connection requests directly from the network interfaces rather than having to first be received in the master application server and then being handed off to the slave application subservers.

In addition, it should be appreciated that there may be more than one slave application subserver associated with one or more of the network interfaces. This is especially true when a particular network interface experiences much higher loads than the other network interfaces. That is, for example, network interface en0 may have both of application subservers 630 and 640 bound to it and thus, both application subservers 630 and 640 listen for traffic on sockets en0.80. In such a case, the remaining network interfaces may be distributed over the remaining slave application subservers. This may be achieved by using the SO_REUSEPORT and SO_REUSEADDR socket options on the en0.80 associated slave application subservers, for example. In such a case, the operating system 650 will evenly distribute the incoming new communication connection requests between the subservers registered with the network interface en0.

It should be appreciated that the present methodology and mechanisms may be extended to provide additional levels of spawning of application servers and subservers. That is, for example, a spawned slave application subserver may itself spawn additional slave application sub-subservers off of itself when a heavy load condition is detected on one or more of the network interfaces being handled by the slave application subserver. As a result, the network interfaces being handled by the slave application subserver may be distributed across the spawned sub-subservers. With such a case, the operating system 650 may evenly distribute the traffic directed to a socket associated with the slave application subserver across the slave application subserver and its sub-subservers that are associated with the particular socket. In this way, the slave application subserver acts as a master application server for all of its sub-subservers.

The mechanisms of the present invention also are used to handle low load conditions as well. That is, if a master application server identifies a low load condition, i.e. the load from one or more of the network interfaces falling below a threshold, then one or more of the slave application subservers may be killed, i.e. deregistered from the operating system and the processing of the slave application subserver discontinued. Before killing the slave application subserver, the master application server may instruct the slave application subserver to stop accepting new communication connection requests and wait until all of their existing communication connections close before exiting.

Thus, the present invention provides a mechanism for dynamically spawning slave application subservers when load conditions of one or more network interfaces of a multiprocessor server computing device are heavy. The present invention improves on the known application server systems in that the slave application subservers are bound to particular ones of the network interfaces and thus, new communication connection requests are automatically sent directly to these slave application subservers by the operating system. As a result, the bottleneck of the master application server experienced in known systems is avoided by the present invention.

Figure 7:
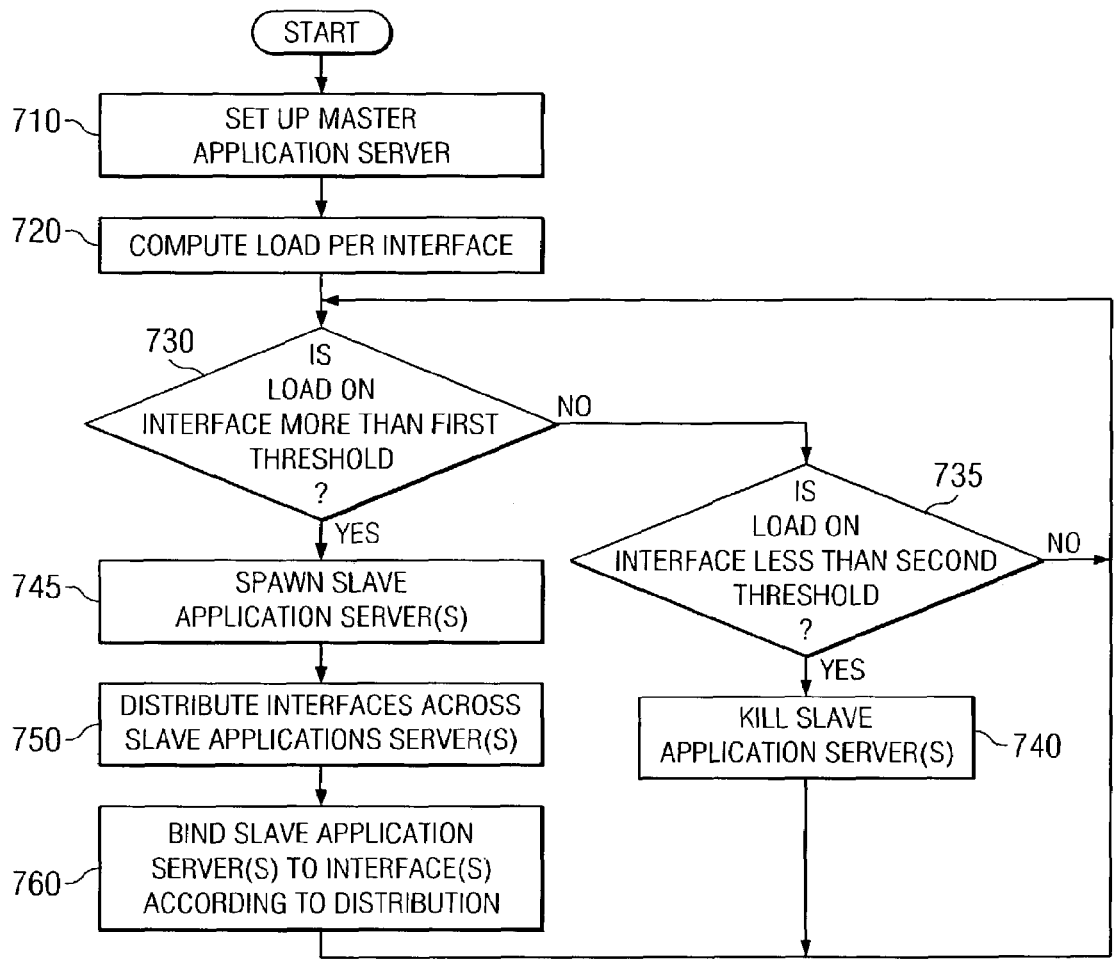
FIG. 7 is a flowchart outlining an exemplary operation of the present invention when spawning slave application servers.

FIG. 7 is a flowchart that illustrates an operation according to one embodiment of the present invention when spawning slave application subservers. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations, of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 7, the operation starts with the master application server being set up (step 710). The load per interface is computed (step 720) and a determination is made as to whether the load on an interface is more than a first threshold amount (step 730). If not, a determination is made as to whether the load on an interface is less than a second threshold amount (step 735). If not, the operation terminates. Otherwise, if the load is less than the second threshold amount, the slave application subserver is killed (step 740).

If the load on an interface is more than the first threshold (step 730), one or more slave application subservers are spawned (step 745). The network interfaces of the server computing system are distributed across the slave application subservers (step 750) and the slave application subservers are bound to the network interfaces in accordance with the distribution (step 760). The operation then continues with a return to step 730. The operation may be terminated by a specific instruction to terminate the operation, by shut-down of the mechanism of the present invention, or the like.

This operation may be repeated at predetermined times or may be performed in a constant loop until a stop condition is encountered. In addition, this operation may be performed for each master application server and slave application server wherein the slave application server is treated as a master application server when determining whether to spawn additional slave application sub-subservers.

With the present invention, the disadvantages of the known application server systems are avoided by removing the burden of handling all new communication connection requests from the master application server. As a result, the efficiency of the overall server computing device is increased, the likelihood that a new communication connection request will be rejected is minimized, and the overall throughput of the server computing device is increased.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of spawning application servers in a server computing device, comprising:

detecting a heavy load condition on one or more network interfaces of the server computing device by a master application server;

spawning one or more slave application subservers in response to the detection of the heavy load condition by the master application server;

distributing network interfaces across the one or more slave application subservers; and binding the one or more slave application subservers to one or more of the network interfaces according to the distribution of network interfaces across the one or more slave application subservers, wherein new communication connection requests are directly routed to a slave application subserver from a network interface associated with the slave application subserver without first being routed to the master application server.

2. The method of claim 1, wherein binding the one or more slave application subservers to one or more of the network interfaces includes binding each slave application subserver to a standard port of an associated network interface.

3. The method of claim 1, wherein a master application server continues to listen for traffic on a standard port of all of the network interfaces.

4. The method of claim 1, wherein distributing the network interfaces includes evenly distributing the network interfaces across the slave application subservers such that each slave application subserver services the same number of network interfaces.

5. The method of claim 4, wherein if there are any excess network interfaces that cannot be assigned to a slave application subserver while maintaining an even distribution across the slave application subservers, the excess network interfaces are assigned to the master application server.

6. The method of claim 1, wherein distributing the network interfaces includes distributing the network interfaces based on an expected traffic level of each network interface.

7. The method of claim 1, wherein if a given slave application subserver fails, any new connection request packets for the given network interface will be given to the master application server.

8. A computer readable storage medium having stored thereon a plurality of instructions, the plurality of instructions including instructions which, when executed by a processor, causing application servers to be spawned in a server computer device, said plurality of instructions comprising:
  first instructions for detecting a heavy load condition on one or more network interfaces of the server computing device by a master application server;
  second instructions for spawning one or more slave application subservers in response to the detection of the heavy load condition by the master application server;
  third instructions for distributing network interfaces across the one or more slave application subservers; and
  fourth instructions for binding the one or more slave application subservers to one or more of the network interfaces according to the distribution of network interfaces across the one or more slave application subservers, wherein new communication connection requests are directly routed to a slave application subserver from a network interface associated with the slave application subserver without first being routed to the master application server.

9. The computer program product of claim 8, wherein the fourth instructions for binding the one or more slave application subservers to one or more of the network interfaces include instructions for binding each slave application subserver to a standard port of an associated network interface.

10. The computer program product of claim 8, wherein a master application server continues to listen for traffic on a standard port of all of the network interfaces.

11. The computer program product of claim 8, wherein the third instructions for distributing the network interfaces include instructions for evenly distributing the network interfaces across the slave application subservers such that each slave application subserver services the same number of network interfaces.

12. The computer program product of claim 11, wherein if there are any excess network interfaces that cannot be assigned to a slave application subserver while maintaining an even distribution across the slave application subservers, the excess network interfaces are assigned to the master application server.

13. The computer program product of claim 8, wherein the third instructions for distributing the network interfaces include instructions for distributing the network interfaces based on an expected traffic level of each network interface.

14. The computer program product of claim 8, wherein if a given slave application subserver fails, any new connection request packets for the given network interface will be given to the master application server.

15. An apparatus for spawning application servers in a server computing device, comprising:
  means for detecting a heavy load condition on one or more network interfaces of the server computing device by a master application server;
  means for spawning one or more slave application subservers in response to the detection of the heavy load condition by the master application server;
  means for distributing network interfaces across the one or more slave application subservers; and
  means for binding the one or more slave application subservers to one or more of the network interfaces according to the distribution of network interfaces across the one or more slave application subservers, wherein new communication connection requests are directly routed to a slave application subserver from a network interface associated with the slave application subserver without first being routed to the master application server.

16. The apparatus of claim 15, wherein the means for binding the one or more slave application subservers to one or more of the network interfaces includes means for binding each slave application subserver to a standard port of an associated network interface.

17. The apparatus of claim 15, wherein a master application server continues to listen for traffic on a standard port of all of the network interfaces.

18. The apparatus of claim 15, wherein the means for distributing the network interfaces includes means for evenly distributing the network interfaces across the slave application subservers such that each slave application subserver services the same number of network interfaces.

19. The apparatus of claim 18, wherein if there are any excess network interfaces that cannot be assigned to a slave application subserver while maintaining an even distribution across the slave application subservers, the excess network interfaces are assigned to the master application server.

20. The apparatus of claim 15, wherein the means for distributing the network interfaces includes means for distributing the network interfaces based on an expected traffic level of each network interface.

21. The apparatus of claim 15, wherein if a given slave application subserver fails, any new connection request packets for the given network interface will be given to the master application server.

22. An apparatus for spawning application servers, comprising:
  a master application server processor providing a master application server; and
  a plurality of network interfaces coupled to the master application server processor;
  wherein the master application server processor monitors load conditions on the plurality of network interfaces to detect a heavy load condition on one or more the plurality of network interfaces and, in response to the detection of a heavy load condition, spawns one or more slave application subservers, and wherein the master application server distributes the plurality of network interfaces across the one or more slave application subservers and binds the one or more slave application subservers to one or more of the plurality of network interfaces according to the distribution of plurality of network interfaces across the one or more slave application subservers, wherein new communication connection requests are directly routed to a slave application subserver from a network interface associated with the slave application subserver without first being routed to the master application server.

23. The apparatus of claim 22, wherein the master application server processor evenly distributes the plurality of network interfaces across the slave application subservers such that each slave application subserver services the same number of network interfaces from the plurality of network interfaces.

24. The apparatus of claim 23, wherein if there are any excess network interfaces that cannot be assigned to a slave application subserver while maintaining an even distribution across the slave application subservers, the master application server processor assigns excess network interfaces to the master application server.

25. The apparatus of claim 22, wherein the master application server processor distributes the plurality of network interfaces based on an expected traffic level of each network interface in the plurality of network interfaces.

26. The apparatus of claim 22, wherein if a given slave application subserver fails, any new connection request packets for the given network interface will be given to the master application server.

27. The apparatus of claim 22, wherein the master application server processor binds each slave application subserver to a standard port of an associated network interface of the plurality of network interfaces.

28. The apparatus of claim 22, wherein the master application server continues to listen for traffic on a standard port of all of the network interfaces in the plurality of network interfaces.

* * * * *